United States Patent
Hundemer et al.

(10) Patent No.: US 10,320,873 B1
(45) Date of Patent: Jun. 11, 2019

(54) NEWSROOM PRODUCTION SYSTEM WITH SYNDICATION FEATURE

(71) Applicant: Tribune Broadcasting Company, LLC, Chicago, IL (US)

(72) Inventors: Hank J. Hundemer, Bellevue, KY (US); Dana Lasher, Morgan Hill, CA (US)

(73) Assignee: Tribune Broadcasting Company, LLC, Chicago, IL (US)

(*) Notice: Subject to any disclaimer, the term of this patent is extended or adjusted under 35 U.S.C. 154(b) by 801 days.

(21) Appl. No.: 14/521,186

(22) Filed: Oct. 22, 2014

Related U.S. Application Data

(60) Provisional application No. 61/895,774, filed on Oct. 25, 2013.

(51) Int. Cl.
*H04L 12/18* (2006.01)
*H04L 29/06* (2006.01)

(52) U.S. Cl.
CPC .......... *H04L 65/602* (2013.01); *H04L 12/18* (2013.01)

(58) Field of Classification Search
USPC ................. 709/217–219, 225, 232
See application file for complete search history.

(56) References Cited

U.S. PATENT DOCUMENTS

| | | | | |
|---|---|---|---|---|
| 8,200,775 B2* | 6/2012 | Moore | ............... | G06F 17/3089 709/217 |
| 8,661,459 B2* | 2/2014 | Gandhi | ............... | G06F 17/3089 715/234 |
| 2002/0108115 A1* | 8/2002 | Palmer | ............... | H04N 7/165 725/50 |
| 2007/0078876 A1* | 4/2007 | Hayashi | ............ | G06F 17/30035 |
| 2007/0113184 A1* | 5/2007 | Haot | .................... | G11B 27/031 715/723 |
| 2008/0165388 A1* | 7/2008 | Serlet | ................... | G11B 27/034 358/448 |
| 2009/0031007 A1* | 1/2009 | Boic | ................. | G06F 17/30053 709/219 |

(Continued)

OTHER PUBLICATIONS

Schatter, Gunther, and Christian Rotzoll. "Subscription of digital broadcast content utilizing the syndication feeds mechanism." IEEE Transactions on Consumer Electronics 54, No. 4 (2008): 2015-2022.*

*Primary Examiner* — Cheikh T Ndiaye
*Assistant Examiner* — Melaku Y Habtemariam
(74) *Attorney, Agent, or Firm* — McDonnell Boehnen Hulbert & Berghoff LLP

(57) ABSTRACT

Disclosed is a system and method relating to the production and syndication of a news program. An example method involves: (i) receiving a first media-stream; (ii) using the received first media-stream to generate a first media-file representing the first media-stream; (iii) using a first portion of the generated first file to generate a second media-stream; (iv) transmitting the generated second media-stream to a broadcasting system for broadcast; (v) using a second portion of the generated first media-file to generate a second media-file representing a third media-stream having a lower bitrate than the first media-stream, wherein the first portion of the generated first media-file is different from the second portion of the generated second media-file; and (vi) transmitting the generated second media-file to a syndication server for syndication.

18 Claims, 4 Drawing Sheets

(56) References Cited

U.S. PATENT DOCUMENTS

| | | | | |
|---|---|---|---|---|
| 2010/0262488 A1* | 10/2010 | Harrison | ............... | G06Q 30/02 |
| | | | | 705/14.46 |
| 2011/0038597 A1* | 2/2011 | McCallister | ........... | H04N 5/262 |
| | | | | 386/239 |
| 2011/0072107 A1* | 3/2011 | Gutta | ............... | G06F 17/30905 |
| | | | | 709/217 |
| 2012/0011267 A1* | 1/2012 | Ma | .................. | H04N 21/44209 |
| | | | | 709/231 |
| 2014/0180818 A1* | 6/2014 | Mistler | ............. | G06Q 30/0259 |
| | | | | 705/14.57 |

* cited by examiner

NEWSROOM PRODUCTION SYSTEM WITH SYNDICATION FEATURE

CROSS REFERENCES TO RELATED DISCLOSURES

The present disclosure claims priority to U.S. Provisional Patent Application No. 61/895,774, entitled "NEWSROOM PRODUCTION SYSTEM WITH SYNDICATION FEATURE," which was filed on Oct. 25, 2013, and which is hereby incorporated by reference in its entirety.

USAGE AND TERMINOLOGY

Throughout this application, with respect to all reasonable derivatives of such terms, and unless otherwise specified (and/or unless the particular context clearly dictates otherwise), each usage of "a" or "an" means at least one, and each usage of "the" means the at least one.

TECHNICAL FIELD

This disclosed system and method relate generally to news production systems.

BACKGROUND

Unless otherwise indicated herein, the materials described in this section are not prior art to the claims in this disclosure and are not admitted to be prior art by inclusion in this section.

A news production system (NPS) may facilitate the production of a news program in the form of a media stream. In one example, an NPS may include multiple media sources and a production switcher. A media source may take a variety of forms. For example, a media source may take the form of a media server, which is a device configured for retrieving a media file, converting the retrieved media file into a media stream, and outputting the converted media stream.

Outputs of the media sources may be connected to inputs of the production switcher. This may allow the production switcher to switch between and/or combine multiple media streams output by the media sources, so that the production switcher may output the news program in the form of another media stream. The NPS may then transmit this media stream to a broadcasting system for broadcast.

There are various types of media, including for example, audio, video, or a combination thereof. As such, in one example, an NPS may produce a news program in the form of an audio stream. In this instance, the NPS may transmit the audio stream to a radio-broadcasting system for broadcast. As another example, a media stream may take the form of a video stream (which may or may not include an audio stream portion). In such instances, the NPS may transmit the video stream to a television-broadcasting system for broadcast.

In some instances, the broadcasting system may modify the media stream in one or more ways before it is broadcast. For example, the broadcasting system may include an effect switcher (sometimes referred to as a stunt switcher) that is configured for receiving a media stream, running a digital video effect (DVE) that modifies the received media stream, and outputting the modified media stream. As one example, an effect switcher may run a DVE that modifies a media stream by overlaying a network logo on the underlying news program. Many other types of DVEs may also be used to modify media streams.

SUMMARY

In one aspect, an example method involves: (i) receiving a first media-stream; (ii) using the received first media-stream to generate a first media-file representing the first media-stream; (iii) using a first portion of the generated first media-file to generate a second media-stream; (iv) transmitting the generated second media-stream to a broadcasting system for broadcast; (v) using a second portion of the generated first media-file to generate a second media-file representing a third media-stream having a lower bitrate than the first media-stream, wherein the first portion of the generated first media-file is different from the second portion of the generated second media-file; and (vi) transmitting the generated second media-file to a syndication server for syndication.

In another aspect, an example non-transitory computer-readable storage medium, has stored thereon program instructions that, upon execution by a processor cause performance of a set of acts including: (i) receiving a first media-stream; (ii) using the received first media-stream to generate a first media-file representing the first media-stream; (iii) using a first portion of the generated first media-file to generate a second media-stream; (iv) transmitting the generated second media-stream to a broadcasting system for broadcast; (v) using a second portion of the generated first media-file to generate a second media-file representing a third media-stream having a lower bitrate than the first media-stream, wherein the first portion of the generated first media-file is different from the second portion of the generated second media-file; and (vi) transmitting the generated second media-file to a syndication server for syndication.

In another aspect, an example system includes a processor; a communication interface; and a non-transitory computer-readable storage medium, has stored thereon program instructions that, upon execution by a processor cause performance of a set of acts including: (i) receiving, via the communication interface, a first media-stream; (ii) using the received first media-stream to generate a first media-file representing the first media-stream; (iii) using a first portion of the generated first media-file to generate a second media-stream; (iv) transmitting the generated second media-stream to a broadcasting system for broadcast; (v) using a second portion of the generated first media-file to generate a second media-file representing a third media-stream having a lower bitrate than the first media-stream, wherein the first portion of the generated first media-file is different from the second portion of the generated second media-file; and (vi) transmitting the generated second media-file to a syndication server for syndication.

These, as well as other aspects, advantages, and alternatives, will become apparent to those of ordinary skill in the art by reading the following detailed description, with reference where appropriate to the accompanying drawings.

DETAILED DESCRIPTION OF THE DRAWINGS

I. Overview

Figure 1:
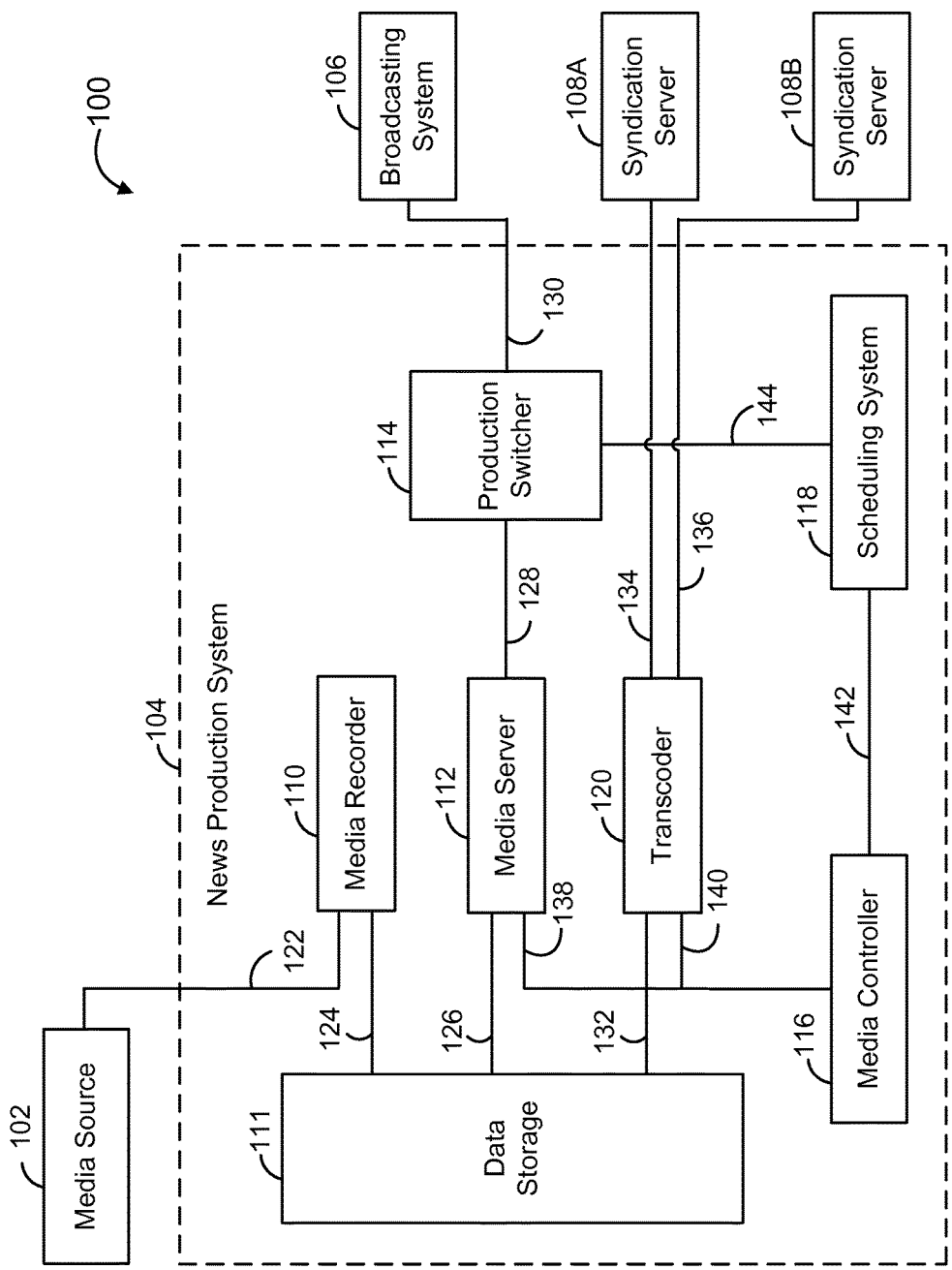
FIG. 1 is a simplified diagram of an example of the disclosed system.

In addition to broadcasting a news program in the form of a media stream, it may also be desired to transmit the news program, in the form of a media file, to a syndication server for syndication. To do this, a broadcasting system may duplicate the media stream output by the effect switcher so that the broadcasting system may transmit one copy to an air-chain system (within the broadcasting system) for broadcast, and another copy to a recording device that may convert the media stream into a media file.

The broadcasting system may then transcode the media file into another media file that adheres to format requirements associated with the syndication server (and that typically represents a media stream having a lower bitrate than the original media stream). The broadcasting system may then transmit (e.g., via file transfer protocol (FTP)) the transcoded media file to the syndication server.

In response to the syndication server receiving a request to generate the media stream (e.g., from a user via a website), the syndication server may retrieve the transcoded media file, convert the retrieved media file into the media stream, and output the converted media stream such that it may be transmitted to a receiver (e.g., a desktop, laptop, or tablet computer, or a cellular phone) for viewing by a user.

Since the process of converting the media stream to the media file occurs after or "downstream from" the process of the effect switcher modifying the media stream, the media file may represent not only the news program, but also any modifications made as a result of the effect switcher running one or more DVEs. This may be undesirable as syndicators may prefer to syndicate the original or "clean" version of the news program.

In an alternative configuration, an NPS may be configured to transmit (e.g., via FTP) to an offsite transcoding server the same media-file that the NPS uses to produce the news program (i.e., the media file that the media server converts into a media stream). In turn, the transcoding server may transcode the media file into another media file that adheres to the requirements of the syndication server (and that typically represents a respective media stream having a lower bitrate than the original media stream). The transcoding server may then transmit the transcoded media file to the syndication server, which may in turn transmit a corresponding media stream to a receiver as discussed above.

In this alternative configuration, since the process of converting the media stream to the media file occurs before or "upstream from" the process of the effect switcher modifying the media stream, the original version of the news program (without any "added" elements) in the form of the transcoded media file may be transmitted to the syndication server for syndication. However, even with this benefit, the alternative configuration may still be undesirable since transmitting the original media file to the offsite transcoding server may take an undesired amount of time. Indeed, it may take several seconds, minutes, or more for the media file to be transmitted to the transcoding server. As a result, there may be an undesired delay between the time that the news program is broadcast and the time that it is available to be syndicated.

The disclosed system and method provide yet another configuration that improves upon the example configurations discussed above, and are described in detail below.

II. Example System

FIG. 1 is a simplified block diagram of an example system 100. The system may include a media source 102, an NPS 104, a broadcasting system 106, a syndication server 108A, and a syndication server 108B. Generally, the NPS 102 is configured to produce a news program and may include a media recorder 110, a data storage 111, a media server 112, a production switcher 114, a media controller 116, a scheduling system 118, and a transcoder 120.

The devices (or systems) of the system 100 may be connected with each other and/or with other devices (or systems) via one or more communication paths. For example, a path 122 may connect the media source 102 and the media recorder 110, a path 124 may connect the data storage 111 and the media recorder 110, a path 126 may connect the data storage 111 and the media server 112, a path 128 may connect the media server 112 and the production switcher 114, and a path 130 may connect the production switcher 114 and the broadcasting system 106.

Further, a path 132 may connect the data storage 111 and the transcoder 120, a path 134 may connect the transcoder 120 and the syndication server 108A, and a path 136 may connect the transcoder 120 and the syndication server 108B. Still further, a path 138 may connect the media controller 116 and the media server 112, a path 140 may connect the media controller 116 and the transcoder 120, a path 142 may connect the media controller 116 and the scheduling system 118, and a path 144 may connect the scheduling system 118 and the production switcher 114.

Though these communication paths, a device may transmit various types of data to one or more other devices. For example, one device may transmit instructions to a second device to control the second device. As another example, one device may transit a media stream to another device. Notably, such devices may exchange data according to one or more standards or protocols. For example, one device may send data to another device in the form of a packet stream.

Generally, the media source 102 is a device configured for outputting a media stream such that it may be used by the NPS 104. A media source may take a variety of forms. For example, the media source 102 may take the form of a satellite receiver, a video camera, or a media server. A media stream may be transmitted according to a variety of different standards. For instance, a media stream may be transmitted according to the high-definition serial digital interface (HD-SDI) (with a data transfer rate of 1.485 Gbps).

Generally, the data storage 110 is a device configured for storing data such as media files and data relating to those media files (e.g., media file metadata).

Generally, the media recorder 110 is a device configured for converting a media stream into a media file (also referred to as "recording a media stream"). For example, the media recorder 110 may receive a media stream from the media source 102 via path 122, convert the received media stream into a media file, and store the converted media file in the data storage 111 via path 124. An example of a media recorder is the K2 server provided by Grass Valley™ of San Francisco, Calif.

Generally, the media server 112 is a device configured for retrieving a media file, converting the retrieved media file into a media stream, and outputting the converted media stream. For example, the media server 112 may receive a media file from the data storage 111 via the path 126, convert the received media file into a media stream, and output the converted media. In some instances, the media recorder 110 and the media server 112 may be combined into a single device. An example of a media server is the K2 server provided by Grass Valley™ of San Francisco, Calif.

Generally, the production switcher 114 is a device configured for using one or more input media streams to generate an output media stream. This may involve the production switcher 114 switching between and/or combine multiple media streams output by the media server 112 or another media source to generate a news program in the form of another media stream. The NPS 104 may then transmit the resulting media stream to the broadcasting system 106 via the path 130 for broadcast. An example of a production switcher is the Vision switcher provided by Ross Video™ of Iroquois, Ontario in Canada.

Generally the broadcasting system 106 is a system configured for broadcasting a media stream to multiple receiver devices (e.g., a television or a set top box). A broadcasting system 106 may include subsystems, such a master control system and an air-chain system, among other things.

Generally, the media controller 116 is a device configured for controlling one or more devices such as the media recorder 110, the media server 112, and/or the transcoder 120. The media controller 120 may provide a user interface such that the controller may control one or more devices in response to receiving commands from a user. For instance, the media controller 116 may cause the media recorder 110, the media server 112, and/or the transcoder 120 to perform one or more of the acts or functions described throughout this disclosure.

Generally, the scheduling system 118 is a system configured for performing functions related to scheduling and managing the production of a news program. For example, the scheduling system 118 may be configured for creating or editing a "rundown" of a news program based on input from a user via a user-interface. Further, the scheduling system 118 may be configured for traversing and processing entries in a rundown by controlling one or more other devices in the NPS 104, including for example the media controller 116 and the production switcher 114 based on data included in the traversed rundown entries.

Each of the syndication servers 108A, 108 is a device configured similar to the media server 112, and may be affiliated with a syndicator.

Figure 2:
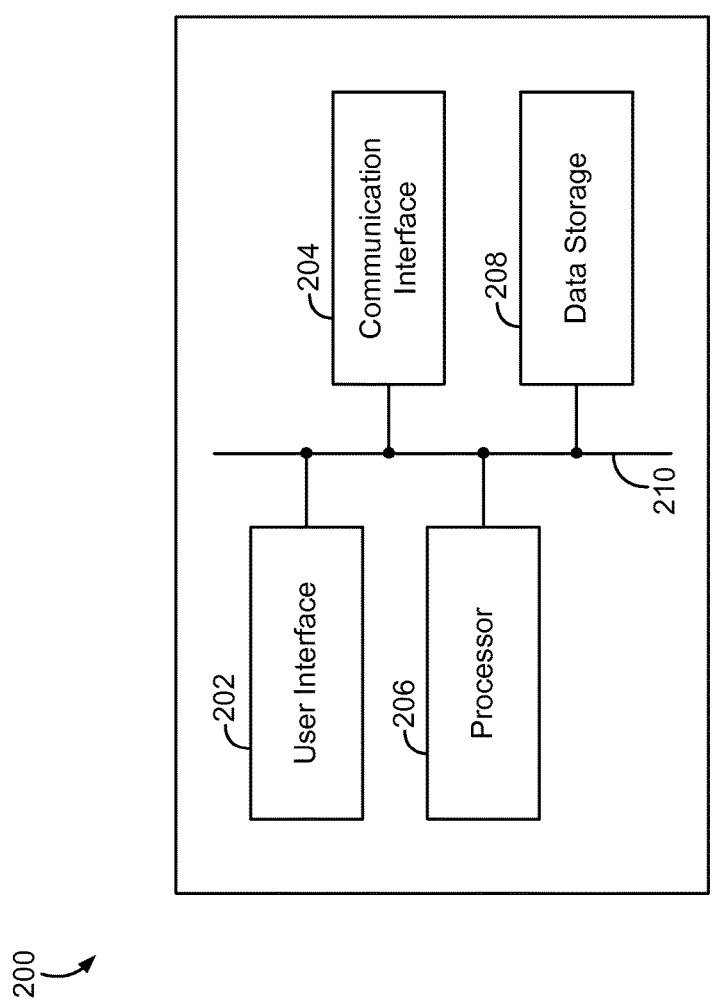
FIG. 2 is a simplified diagram of an example of a device of the disclosed system.

FIG. 2 is a simplified block diagram of a device 200. The device 200 may take a variety of forms, including, for example, the media source 102, the media recorder 110, the data storage 111, the media server 112, the production switcher 114, the media controller 116, the scheduling system 118, the transcoder, 120, the syndication server 108A, and the syndication server 108B.

The device 200 may include various components, including, for example, a user interface 202, a communication interface 204, a processor 206, and a data storage 208, all of which may be electronically connected to each other via a system bus or other connection mechanism 210. Note that the device 200 need not include all of these components and it may include additional components.

The user interface 202 may function to allow the device 200 to interact with a user, such as to receive input from a user and to provide output to the user. Thus, the user interface 202 may include input components such as a computer mouse, a keyboard, or a touch-sensitive panel. The user interface 202 may also include output components such as a display screen (which, for example, may be combined with a touch-sensitive panel) or a speaker.

The communication interface 204 may function to allow the device 200 to communicate with one or more other devices (e.g., over one or more paths as described above). The communication interface 204 may be configured to transmit and/or receive various types of data, including for example control data or media stream data. In one example, the communication interface 204 may take the form of a wired interface, such as an Ethernet port, USB port, or HD-SDI port. As another example, the communication interface 204 may take the form of a wireless interface, such as a WiFi interface. In either case, the communication interface 204 may include communication input and/or communication output interfaces.

The processor 206 may include one or more general purpose processors (e.g., microprocessors) and/or one or more special purpose processors (e.g., digital signal processors (DSPs)).

The data storage 208 may include one or more volatile and/or non-volatile storage components, such as magnetic, optical, flash, or organic storage, and may be integrated in whole or in part with the processor 206. The data storage 208 may include removable and/or non-removable components. In some examples, the data storage 208 may include multiple storage drives that store data in a redundant and/or stripped configuration.

Generally, the processor 206 may be configured to execute program instructions (e.g., compiled or non-compiled program logic and/or machine code) stored in the data storage 208 to perform one or more of the acts or functions described herein and/or shown in the accompanying drawings. As such, the data storage 208 may take the form of a non-transitory computer-readable storage medium, having stored thereon program instructions that, upon execution by the processor 206, cause the device 200 to perform one or more of the acts or functions described herein and/or shown in the accompanying drawings.

III. Example Operations

Figure 3:
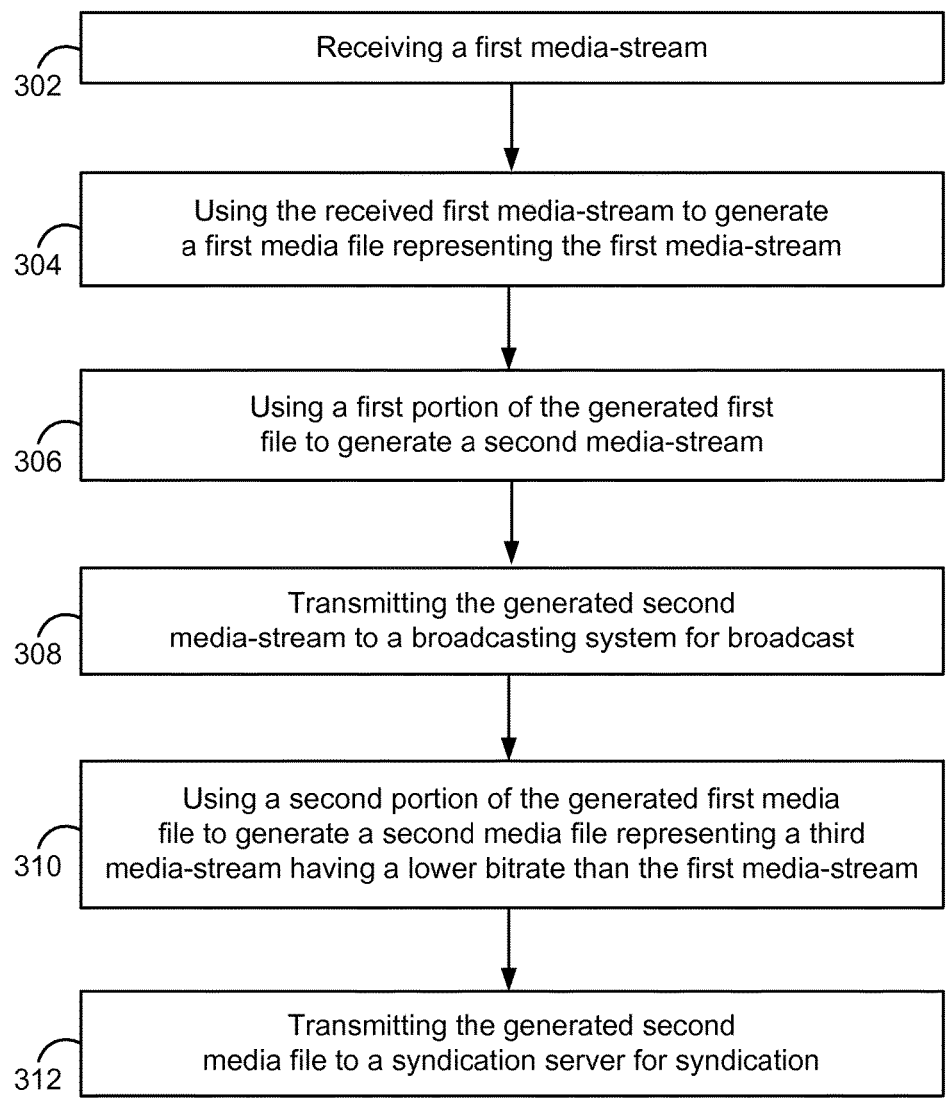
FIG. 3 is a flowchart showing acts of an example of the disclosed method.
Figure 4:
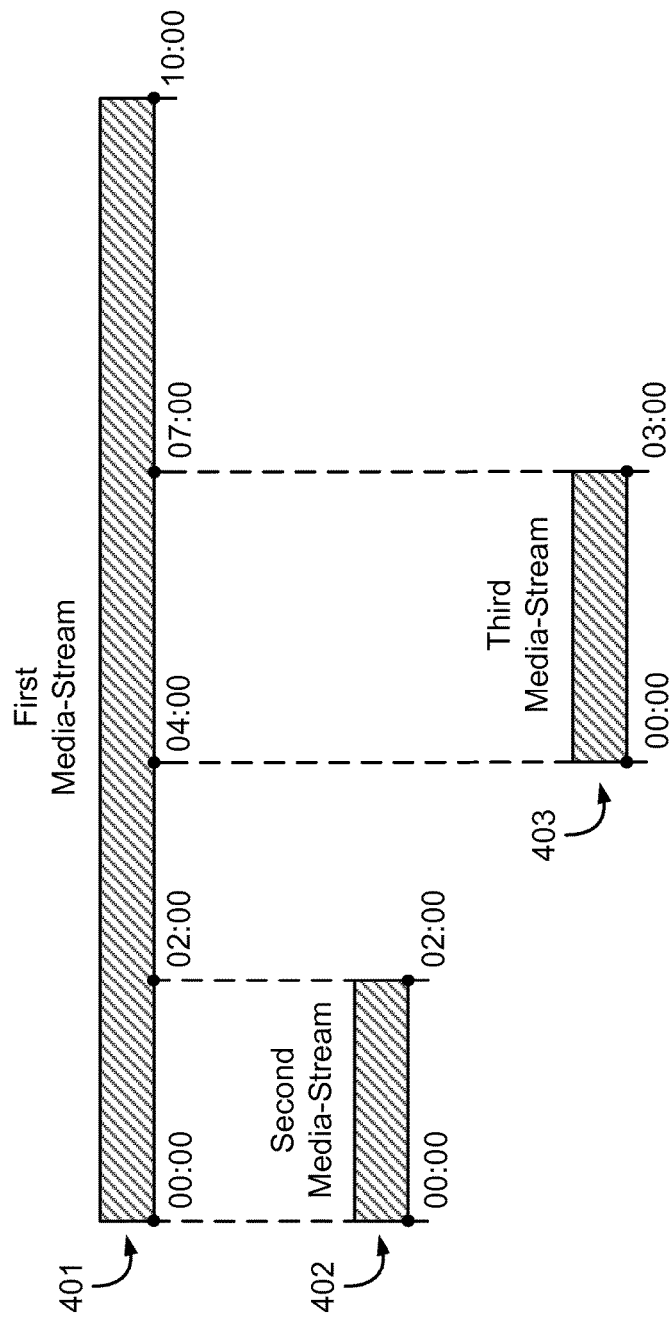
FIG. 4 depicts various example media streams in accordance with the disclosed system and method.

FIG. 3 is a flowchart showing acts of a first example of the disclosed method. At block 302, the method may involve receiving a first media-stream. For example, the method may involve the NPS 104, and more specifically the media recorder 110 receiving a first media-stream 401 as depicted in FIG. 4. For illustration purposes, it is assumed that the first media-stream 401 is a ten-minute video stream of press-conference. In one example, the media receiver 110 receives the first media-stream 401 from the media source 102 via the path 122.

At block 304, the method may involve using the received first media-stream to generate a first media-file representing the first media-stream. For instance, the method may involve the NPS 104, and more specifically the media recorder 110 using the first media-stream 401 to generate a first media-file representing the first media-stream 401. The media recorder 110 using the first media-stream 401 to generate the first media-file may involve the media recorder 110 converting the first media-stream 401 into the first media-file.

In some embodiments, the acts at blocks 302 and 304 may occur contemporaneously or substantially simultaneously such that the media recorder 110 generates the first media-file as the media recorder 110 receives the first media-stream 401. The media recorder 110 may store the first media-file in a data storage within the media recorder 110, and/or in another data storage such as the data storage 111 via the path 124. This storing act may occur contemporaneously or substantially simultaneously with the acts at blocks 302 and/or 304.

Further, in some instances, the media recorder 110 may perform the acts at blocks 302 and/or 304 in response to the media recorder 110 receiving suitable instructions from the media controller 116. And the media controller 116 may send such instructions in response to receiving a request via a user interface from a user. As such, a user may cause the media recorder 110 to use the first media-stream 401 received by the media source 102 to generate the first media-file.

In some instances, the media controller 116 may also receive (e.g., from a user via a user interface) metadata for the media file. For example, the media controller 116 may receive a title, location, or other metadata for the media file. The media controller 116 may then store such data in a data storage, such as in the data storage 111.

At block 306, the method may involve using a first portion of the generated first media-file to generate a second media-stream. For instance, the method may involve the NPS 104, and more specifically the media server 112 using a first portion of the first media-file to generate a second media-stream 402 as depicted in FIG. 4. This may involve the media server 112 converting the first portion of the first media-file into the second media-stream 402. The second media-stream 102 may be a proper subset of (i.e. a portion but not all of) the first media stream 401.

As shown in FIG. 4, the second media-stream 402 is the first two minutes of the press conference. FIG. 4 shows dashed lines to indicate how the second media-stream 402 corresponds with a portion of the first media-stream 401.

At block 308, the method may involve transmitting the generated second media-stream to a broadcasting system for broadcast. For instance, the method may involve the NPS 104, and more specifically the media server 112 transmitting the second media-stream 402 to the broadcasting system 106 for broadcast. This may involve the media server 112 transmitting the second media-stream 402 to the production switcher 114 via the path 128, and the production switcher 114 transmitting the second media-stream to the broadcasting system 106 via the path 130. The broadcasting system 106 may then broadcast the second media-stream 402 such that it may be received by multiple receivers substantially simultaneously. As noted above, the broadcasting system 106 may further modify the second media-stream 402 before broadcasting it (by overlaying graphics, etc.).

At block 310, the method may involve using a second portion of the generated first media-file to generate a second media-file representing a third media-stream having a lower bitrate than the first media-stream. For instance the method may involve the NPS 104, and more specifically the transcoder 120 using a second portion of the first media-file to generate a second media-file representing a third media-stream 403 (depicted in FIG. 4) having a lower bitrate than the first media-stream 401. This may involve the transcoder 120 converting the second portion of the first media-file into the second media-file. The third media-stream 102 may be a proper subset of the first media stream 401.

As shown in FIG. 4, the third media-stream 403 is the fourth minute to the seventh minute of the press conference. FIG. 4 shows dashed lines to indicate how the third media-stream 403 corresponds with a portion of the first media-stream 401.

At block 312, the method may involve transmitting the generated second media-file to a syndication server for syndication. For instance, the method may involve the NPS 104, and more particularly the transcoder 120 transmitting the second media-file to the syndication server 108A for syndication.

In some embodiments, the method may further involve the syndication server using the second media-file to generate a fourth media-stream, and transmitting the generated fourth media-stream to a receiver (e.g., a desktop, laptop, or tablet computer, or a cellular phone) for viewing by a user, such as in response to the syndication server receiving a suitable request from the receiver.

Notably, in the examples provided above, the first and second portions of the first media-file were different. This provides a benefit in that a first portion of a media stream may be broadcast, yet a second and different portion of the same media stream may be distributed via syndication with little or no delay. Such a feature is not provided by the other configurations discussed above. Also, it should be noted that while two specific portions of the first media-file were discussed in the examples above, the portions may vary as desired. In some instances, the portions may overlap at least in part or not overlap at all. And in another example, the portions may be the same.

Further, in some instance, the NPS may transmit the generated second media-stream to the broadcasting system for broadcast while the NPS transmits the generated second media-file to the syndication server for syndication. As such, the NPS 104, and more particularly the media server 112 may transmit the first media-stream 400 to the broadcasting system 106 for broadcast while the NPS 104, and more particularly the transcoder 120 transits the second media-file to the syndication server 108A for broadcast.

As noted above, is may be desired to syndicate a portion of a news program at the same time as or with minimal delay after that portion has been broadcast. Given the configuration of the NPS 104, the NPS may cause these two events to happen contemporaneously or substantially simultaneously. This provides an advantage over the alternative configurations discussed above where a much greater delay is likely to be present. Further, as noted above, the NPS 104 may allow for the syndication of a portion of a news program from a media stream at the same time as or with minimal delay after another portion from the same media stream has been broadcast system.

In some instances, the method may further involve the NPS (i) retrieving metadata associated with the generated first media-file; (ii) using the retrieved metadata to generate metadata associated with the generated second media-file; and (iii) transmitting the generated metadata to the syndication server. For instance, the method may involve the NPS 104, and more specifically the transcoder 120 (i) retrieving from the data storage 111 metadata associated with the first media-file, (ii) using the retrieved metadata to generate metadata associated with the second media-file, and (iii) transmitting the generated metadata to the syndication server 108A. In some instances, generating metadata associated with the second media-file may involve mapping attribute fields associated with the first media-file to attribute fields associated with the second media file. Such mapping may be configured by a user, for example. The generated metadata may include a thumbnail image and a title, among other things.

It should be noted that the acts at blocks 310 and 312 and/or one or more of the other acts described above may be repeated to provide additional media files (perhaps generated using different portions of the first media-file) and/or associated metadata to additional syndication servers, such as to the syndication server 108B. In one example, the user interface of the media controller 116 may be configured to allow a user to select particular portions of the first media-file and/or particular syndication servers to customize the data provided to one or more syndication servers.

IV. Example Variations

While one or more acts have been described as being performed by certain devices or entities (e.g., the NPS 104, the media recorder 110, the media server 112, the transcoder, and/or the media controller 116), the acts may be performed by any device or entity, such as those included in the NPS 100 described above. Also, the acts need not be performed in the disclosed order, although in some examples, an order may be preferred. And not all acts need to be performed to achieve the desired advantages of the disclosed system and method, and therefore not all acts are required.

It should also be noted that the variations described in connection with select examples of the disclosed system and method may be applied to all other examples of the disclosed system or method.

Further, while select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

The invention claimed is:

1. A method comprising:
   receiving a first media-stream;
   using the received first media-stream to generate a first media-file representing the first media-stream;
   using a first portion of the generated first media-file to generate a second media-stream;
   transmitting the generated second media-stream to a broadcasting system for broadcast;
   using a second portion of the generated first media-file to generate a second media-file representing a third media-stream having a lower bitrate than the first media-stream, wherein the first portion of the generated first media-file is different from the second portion of the generated first media-file; and
   transmitting the generated second media-file to a syndication server for syndication, wherein transmitting the generated second media-stream to the broadcasting system for broadcast occurs while transmitting the generated second media-file to the syndication server for syndication.

2. The method of claim 1, further comprising:
   the syndication server using the transmitted second file to generate a fourth media-stream; and
   the syndication server transmitting the generated fourth media-stream to a receiver.

3. The method of claim 1, further comprising:
   retrieving metadata associated with the generated first media-file;
   using the retrieved metadata to generate metadata associated with the generated second media-file; and
   transmitting the generated metadata to the syndication server.

4. The method of claim 3, wherein the generated metadata comprises a thumbnail image and a title.

5. The method of claim 1, wherein (i) using the received first media-stream to generate the first media-file comprises converting the received first media-stream into the first media-file, (ii) using the first portion of the generated first media-file to generate the second media-stream comprises converting the first portion of the generated first media-file into the second media-stream, and (iii) using the second portion of the generated first media-file to generate the second file comprises converting the second portion of the generated first media-file into the second media-file.

6. The method of claim 1, wherein the first media-stream represents a news program.

7. A non-transitory computer-readable storage medium, having stored thereon program instructions that, upon execution by a processor cause performance of a set of acts comprising:
   receiving a first media-stream;
   using the received first media-stream to generate a first media-file representing the first media-stream;
   using a first portion of the generated first media-file to generate a second media-stream;
   transmitting the generated second media-stream to a broadcasting system for broadcast;
   using a second portion of the generated first media-file to generate a second media-file representing a third media-stream, wherein the first portion of the generated first media-file is different from the second portion of the generated first media-file; and
   transmitting the generated second media-file to a syndication server for syndication, wherein transmitting the generated second media-stream to the broadcasting system for broadcast occurs while transmitting the generated second media-file to the syndication server for syndication.

8. The computer-readable storage medium of claim 7, the set of acts further comprising:
   retrieving metadata associated with the generated first media-file;
   using the retrieved metadata to generate metadata associated with the generated second media-file; and
   transmitting the generated metadata to the syndication server.

9. The computer-readable storage medium of claim 8, wherein the generated metadata comprises a thumbnail image and a title.

10. The computer-readable storage medium of claim 7, wherein (i) using the received first media-stream to generate the first media-file comprises converting the received first media-stream into the first media-file, (ii) using the first portion of the generated first media-file to generate the second media-stream comprises converting the first portion of the generated first media-file into the second media-stream, and (iii) using the second portion of the generated first media-file to generate the second media-file comprises converting the second portion of the generated first media-file into the second media-file.

11. The computer-readable storage medium of claim 7, wherein the third media-stream has a lower bitrate than the first media-stream.

12. The computer-readable storage medium of claim 7, wherein the first media-stream represents a news program.

13. A system comprising:
   a processor, wherein the processor is at least partially a hardware component;
   a communication interface; and
   a non-transitory computer-readable storage medium having stored thereon program instructions that, upon execution by the processor cause performance of a set of acts comprising:
      receiving, via the communication interface, a first media-stream;
      using the received first media-stream to generate a first media-file representing the first media-stream;
      using a first portion of the generated first media-file to generate a second media-stream;

transmitting the generated second media-stream to a broadcasting system for broadcast;

using a second portion of the generated first media-file to generate a second media-file representing a third media-stream, wherein the first portion of the generated first media-file is different from the second portion of the generated first media-file; and transmitting the generated second media-file to a syndication server for syndication, wherein transmitting the generated second media-stream to the broadcasting system for broadcast occurs while transmitting the generated second media-file to the syndication server for syndication.

14. The system of claim 13, the set of acts further comprising:

retrieving metadata associated with the generated first media-file;

using the retrieved metadata to generate metadata associated with the generated second media-file; and transmitting the generated metadata to the syndication server.

15. The system of claim 13, wherein (i) using the received first media-stream to generate the first media-file comprises converting the received first media-stream into the first media-file, (ii) using the first portion of the generated first media-file to generate the second media-stream comprises converting the first portion of the generated first media-file into the second media-stream, and (iii) using the second portion of the generated first media-file to generate the second media-file comprises converting the second portion of the generated first media-file into the second media-file.

16. The system of claim 13, wherein the third media-stream has a lower bitrate than the first media-stream.

17. The system of claim 13, wherein the first media-stream represents a news program.

18. The system of claim 13, wherein the system comprises a news production system.

* * * * *